US005936771A

United States Patent [19]
Cooper

[11] Patent Number: 5,936,771
[45] Date of Patent: Aug. 10, 1999

[54] COMPACT FLIR OPTICAL CONFIGURATION

[75] Inventor: Erwin E. Cooper, Frisco, Tex.

[73] Assignee: Raytheon Company, Lexington, Mass.

[21] Appl. No.: 08/904,139

[22] Filed: Jul. 31, 1997

[51] Int. Cl.$^6$ .............................. G02B 27/10; G01C 21/02
[52] U.S. Cl. ....................... 359/618; 359/365; 250/203.6; 244/3.16
[58] Field of Search ...................................... 359/365, 366, 359/618; 250/203.1, 203.3, 203.6; 244/3.16

[56] References Cited

U.S. PATENT DOCUMENTS

| | | | |
|---|---|---|---|
| 4,009,848 | 3/1977 | Albert et al. | 244/3.16 |
| 4,123,134 | 10/1978 | Meyers | 359/216 |
| 5,091,637 | 2/1992 | Edwards | 250/203.6 |
| 5,262,630 | 11/1993 | Kordulla | 250/203.6 |
| 5,363,235 | 11/1994 | Kiunke et al. | 359/365 |
| 5,510,618 | 4/1996 | Blecha et al. | 250/332 |
| 5,796,474 | 8/1998 | Squire et al. | 250/203.6 |

FOREIGN PATENT DOCUMENTS

0538671A1 4/1993 European Pat. Off. .

*Primary Examiner*—Loha Ben
*Attorney, Agent, or Firm*—Baker & Baker, L. L. P.

[57] ABSTRACT

A FLIR system having a refractive FLIR optical configuration including a substantially spherical housing and an optical window disposed in and extending to the outer housing surface. The window aperture diameter exceeds the housing radius and is a near dome-shaped, relatively high dispersive negative lens forming a part of the FLIR optical system and is disposed adjacent a positive relatively low dispersive lens. A first optical system extends to a first housing window for receiving light and is within a hemispherical housing portion comprises an afocal lens system of a first pair of lenses, one lens disposed at a housing wall, a first mirror disposed within the hemisphere and reflecting light passing through the first pair of lenses, a second mirror for receiving the light reflected from the first mirror and reflecting the light along a path parallel to the light impinging upon the first mirror and a further plurality of lenses for transmission of the light reflected from the second mirror. The light reflected from the first mirror preferably is reflected in a direction normal to the light impinging upon the first mirror. A second window is disposed at the housing surface and a second optical system disposed within the housing is bounded by the hemisphere, receives light through the second window and is capable of selectively substituting the second optical system for a portion of the first optical system. Apparatus is provided to selectively substitute the second optical system for the first pair of lenses, the first mirror and the second mirror.

36 Claims, 5 Drawing Sheets

COMPACT FLIR OPTICAL CONFIGURATION

BACKGROUND OF THE INVENTION

1. Field of the Invention

This invention relates to a refractive optical configuration for a plural field-of-view forward looking infrared (FLIR) sensor.

2. Brief Description of the Prior Art

Airborne FLIR sensors are generally housed in a truncated spherical envelope typical of that used in a two-axis mass gimbal configuration. The truncation is necessary to accommodate the gimbal structure secured thereto. The size of the spherical housing is usually determined by the minimum diameter required to encompass the optical configuration. As a result, the optics utilize the majority of the volume within the truncated sphere and little room is left for other necessary components, such as the detector and its cooling apparatus and the electronics. Space for other electro-optical devices is therefore also very restricted.

Furthermore, the maximum size of the prior art FLIR aperture diameter has been limited to, at most, less than 45 percent of the diameter of the spherical housing due to the size of the optics and the loss in volume within the housing for a flat window to cover the optical aperture and the sag of the window within the spherical envelope. These flat windows also cause drag variations on the gimbal as a function of gimbal angle, making stabilization difficult for high resolution.

Existing FLIR sensors are designed for a given number of detector elements, such as 240 or 480, and require a total redesign of the optics and sensor to change these performance characteristics.

All known prior art FLIR systems have enclosed the FLIR optical components within the minimum size spherical envelope as discussed above or increased the size of the optics to fill a known spherical size. The other components are fitted into the remaining space which is usually minimal. In the case of an aircraft pod, such as that on the F18 aircraft, a roll over pitch gimbal is employed. The truncated spherical envelope contains only optical components and additional optics are required to relay the image to the detector and other components located on other parts of the gimbal.

In summary, in the prior art, the optical aperture in any known gimbal FLIR does not exceed 45 percent of the spherical envelope diameter and the optics and the window extend from the front to the rear of the sphere. All known prior art high resolution FLIRs use flat windows in the spherical housing. If the FLIR aperture is large compared to the diameter of the spherical housing, the sag of the flat window from the spherical shape is also large. This makes the aerodynamic drag vary as a function of gimbal angle and causes large torque variations on the gimbal. No known prior art FLIRs have the capability to change detector arrays from 240 element to 480 element.

SUMMARY OF THE INVENTION

In accordance with the present invention, there is provided an extremely compact, refractive optical configuration for a plural field-of-view (FOV), preferably three FOV, FLIR sensor which minimizes the size and weight required to achieve high resolution with a large diameter optical aperture. The diameter of the optical aperture is somewhat greater than one half the diameter of the spherical envelope or housing, being about 52 percent of the diameter of the spherical envelope in a preferred embodiment, and, in addition, all of the optical components are located in less than one half of the spherical envelope, leaving ample room for other necessary components. The sensor is configured to fit in a truncated spherical envelope typical of that used for two-axis mass stabilized gimbals. The window for the large FLIR aperture conforms to the spherical envelope to minimize aerodynamic drag and provides color correction for the narrow FOV optics. The entire optical system in accordance with the present invention can be designed for existing 240 element and 480 element detectors.

Briefly, there is provided a FLIR system having a refractive FLIR optical configuration which includes a substantially spherical, possibly truncated, housing having a center and substantially circular cross-sections, and an optical window disposed in and extending to the outer surface of the housing, the diameter of the optical window exceeding the radius of a circular cross-section passing through the center of the housing. The optical window is a lens forming a part of the FLIR optical system, the lens being a near dome-shaped negative lens of relatively high dispersive material. The system further includes a positive lens disposed adjacent the negative lens of relatively low dispersive material. The system also includes a first optical system disposed within the housing and extending to a first window at the housing for receiving light. The first optical system is disposed in a volume within the housing bounded by the housing and a plane passing through the center of the housing. The first optical system comprises an afocal lens system of a first pair of lenses, one lens disposed at a wall of the housing, a first mirror disposed within the volume within the housing bounded by the housing and the plane passing through the center of the housing and reflecting light passing through the first pair a lenses and impinging thereon, a second mirror for receiving the light reflected from the first mirror and reflecting the light along a path parallel to the light impinging upon the first mirror and a further plurality of lenses for transmission of the light reflected from the second mirror. One lens of the first pair of lenses is a near dome-shaped negative of relatively high dispersive material and the other lens is a positive Ge lens disposed adjacent the negative lens of relatively low dispersive material. The light reflected from the first mirror is reflected preferably in a direction normal to the direction of the light impinging upon the first mirror. The system further includes a second window disposed at the surface of the housing and a second optical system disposed in the volume within the housing bounded by the housing and a plane passing through the center of the housing receiving light through the second window and is capable of selectively substituting the second optical system for a portion of the first optical system. The system further includes apparatus to selectively substitute the second optical system for the first pair of lenses, the first mirror and the second mirror.

DESCRIPTION OF THE PREFERRED EMBODIMENT

Figure 1:
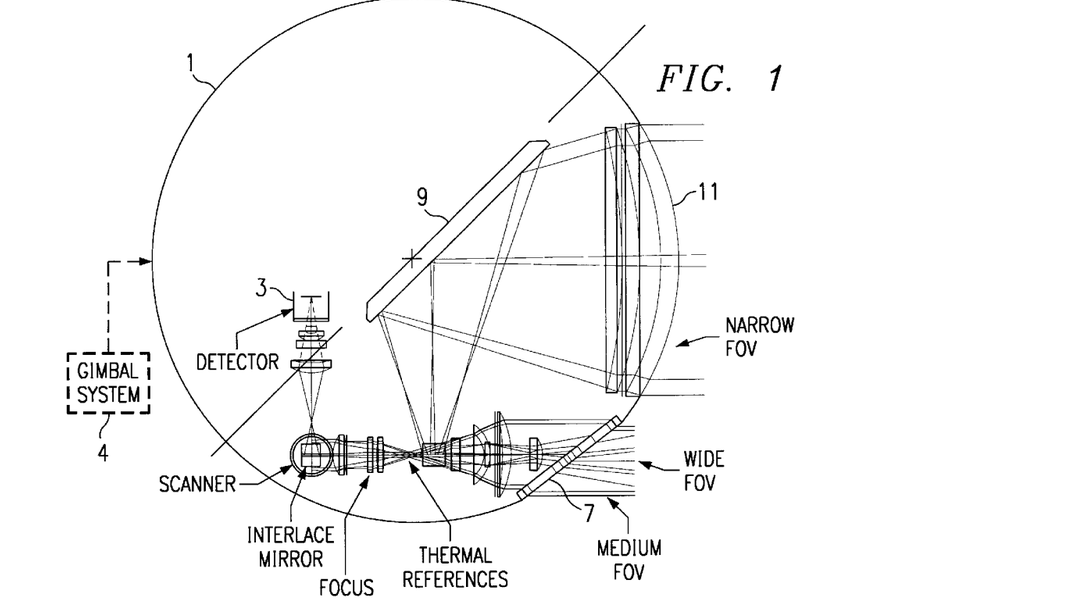
FIG. 1 is a schematic diagram of an optical configuration in accordance with the present invention disposed within a spherical enclosure.

Referring to FIG. 1, there is shown a FLIR optical configuration in accordance with the present invention wherein the optical components are located in the lower, front, one-half of the truncated spherical housing 1. The other one-half of the housing is available for the remaining assemblies such as the detector 3, detector cooling (not shown), gyros (not shown) and electronics (not shown).

The spherical housing 1 is supported for pivotal movement about its center by a gimbal system 4, and includes a window 11 for the narrow FOV system and a window 7 for the medium and wide FOV systems. The scene entering the window 11 for the narrow FOV system travels in a folded path by initially impinging upon a diamond point turning (DPT) fold mirror 9, which is typically an aluminum mirror, disposed generally along a plane passing through the center of the housing 1. As can be seen in FIG. 1, all of the FOV optics is disposed within the half of the housing on one side of the plane of the mirror 9. As will be explained hereinbelow, a portion of the optics of the optical system is used in conjunction with each of the narrow, medium and wide FOV systems.

Figure 2:
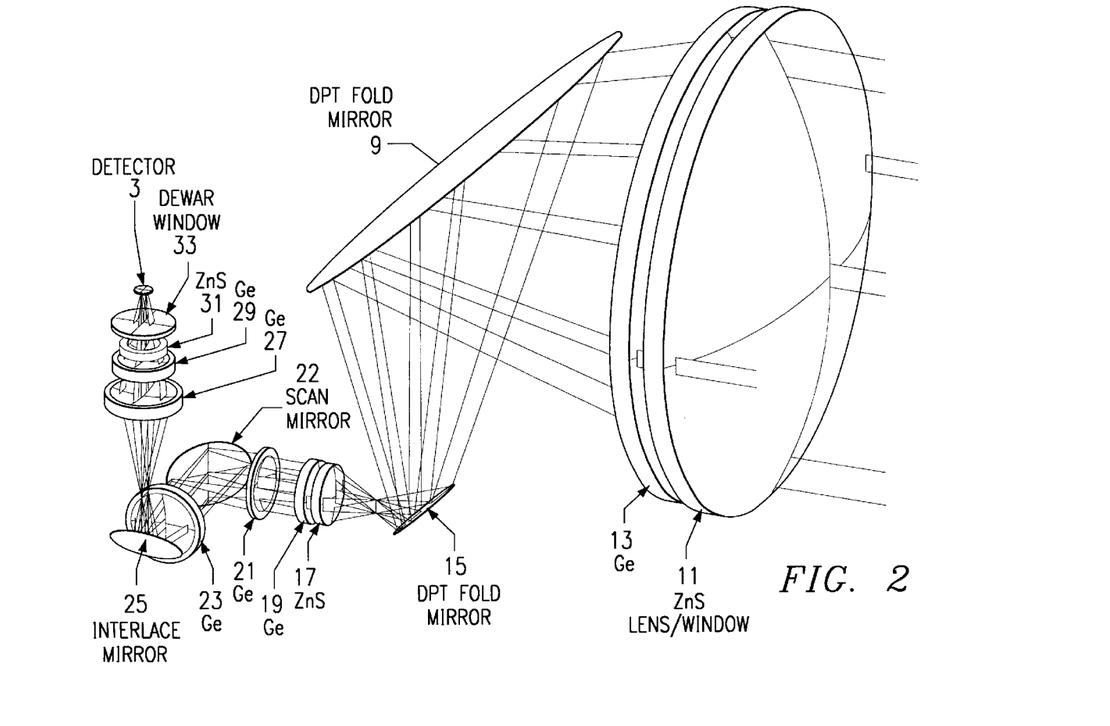
FIG. 2 is an enlarged perspective view of the narrow FOV optics portion of the optical configuration of FIG. 1.

The narrow FOV system is shown in greater detail in FIG. 2 and includes a first curved, near dome-shaped negative ZnS lens 11 of high dispersive material which also acts as the window on the surface of the housing 1 for the narrow FOV system. This lens has a radius of curvature at the exterior-facing surface thereof close to but not necessarily the same as that of the surface of the housing 1. A positive Ge lens 13 of low dispersive material having a relatively large radius of curvature at its downstream surface and a relatively small radius of curvature at its upstream surface is positioned adjacent to the lens 11 and within the housing 1. Collimated light passes through lenses 11 and 13 and against the first DPT fold mirror 9 to a second DPT fold mirror 15. Lens 11 provides axial color correction. The light is then reflected from the mirror 15 to an image plane, then through a series of lenses which include a ZnS lens 17 followed by Ge lenses 19 and 21. The lenses described to this point comprise an afocal lens system with magnification equal to 8.66x. The light emanating from lens 21 impinges upon a scan mirror 22 which oscillates about a vertical axis for horizontal scanning of the entire horizontal FOV and is reflected therefrom through a Ge lens 23 to an interlace mirror 25. The interlace mirror 25 then reflects the light in an interlaced pattern through detector optics which includes Ge lenses 27, 29 and ZnS lens 31 and through the Dewar window 33 to the detector 3.

As can be seen from FIG. 1, the medium and wide FOV optical systems can be disposed below the narrow FOV optical system and in the same hemisphere half. It should be understood that the medium and/or wide FOV optical system can be eliminated with only a narrow FOV optical system and one or none of the other disclosed optical systems present.

Figure 3:
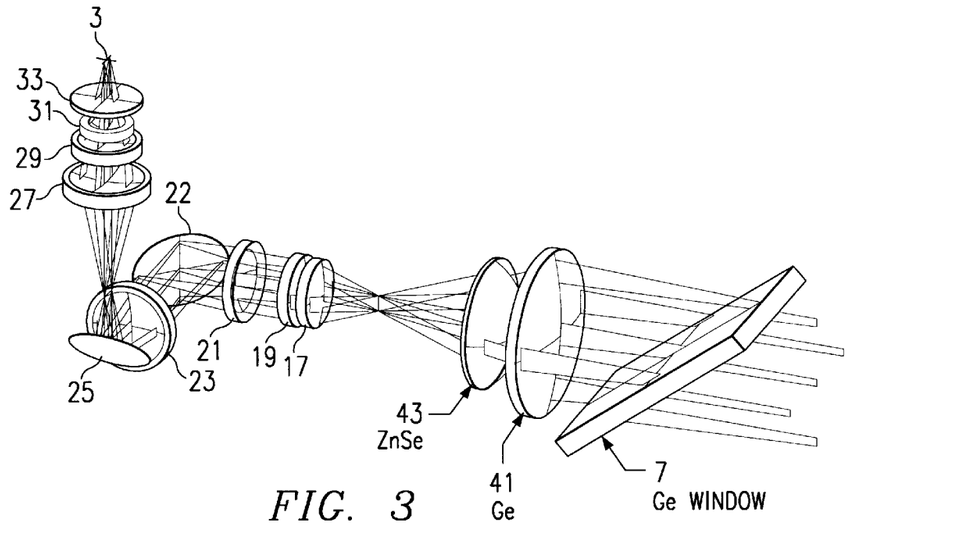
FIG. 3 is an enlarged perspective view of the medium FOV optics portion of the optical configuration of FIG. 1.

Referring now to FIG. 3, there is shown the optics for the medium FOV system in greater detail. The system includes a Ge window 7 as also shown in FIG. 1 through which collimated light passes. This collimated light then travels through a Ge lens 41 and ZnSe lens 43 to the lens 17 as shown in FIG. 2 and then through the remainder of the optical system as shown in FIG. 2 to the detector 3. The optical system for medium FOV up to the scan mirror 22 is an afocal lens system. When the medium FOV system is in operation, the mirror 15 and the optics specific to the wide FOV system discussed hereinbelow are removed from the optical path of the medium FOV optical system.

Figure 4:
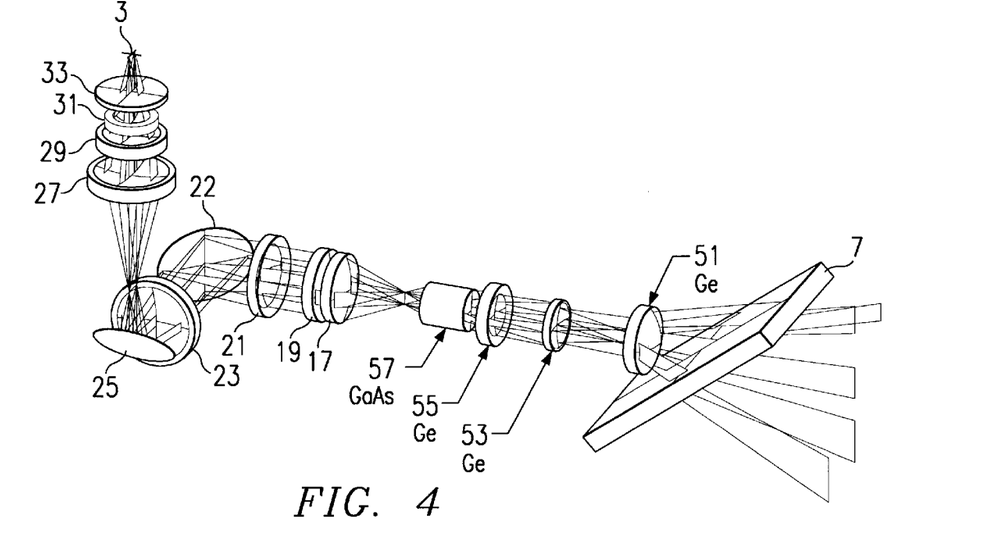
FIG. 4 is an enlarged perspective view of the wide FOV optics portion of the optical configuration of FIG. 1.

Referring now to FIG. 4, there is shown the optics for the wide FOV system in greater detail. The system includes the Ge window 7 as also shown in FIGS. 1 and 3 through which collimated light passes. This collimated light then travels through three Ge lenses 51, 53 and 55 and GaAs lens 57 to the lens 17 as shown in FIGS. 2 and 3 and then through the remainder of the optical system as shown in FIGS. 2 and 3 to the detector 3. The optical system for wide FOV up to the scan mirror 22 is an afocal lens system. When the wide FOV system is in operation, the mirror 15 and the optics specific to the medium FOV system discussed above are removed from the optical path of the wide FOV optical system.

Figure 5A:
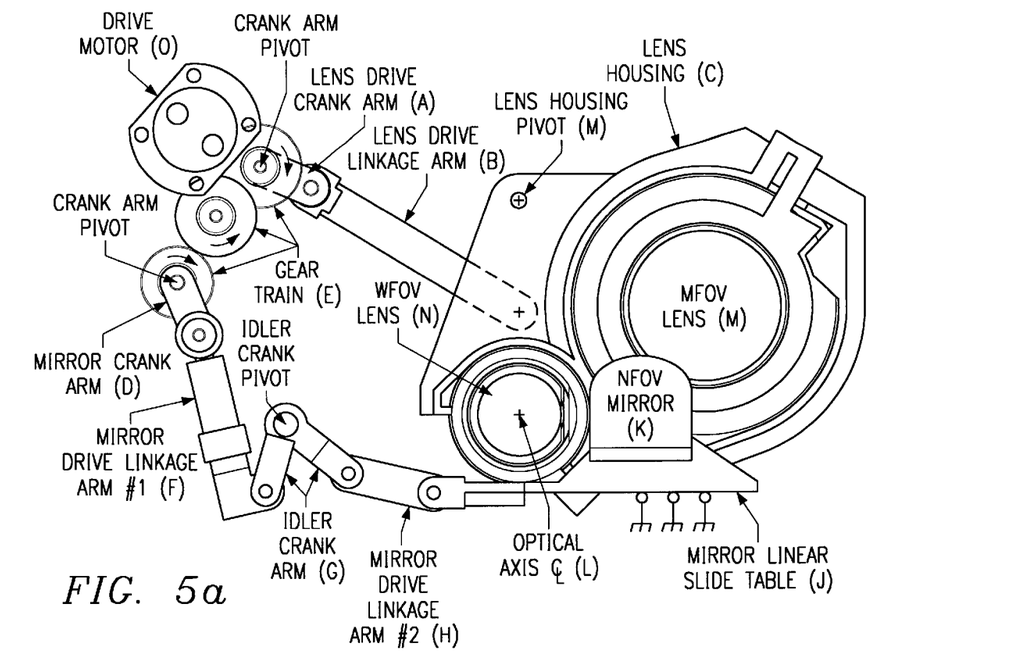
FIG. 5a is a side view of a structural arrangement for switching among the three fields of view, showing the arrangement in an operational position for a wide field of view.
Figure 5B:
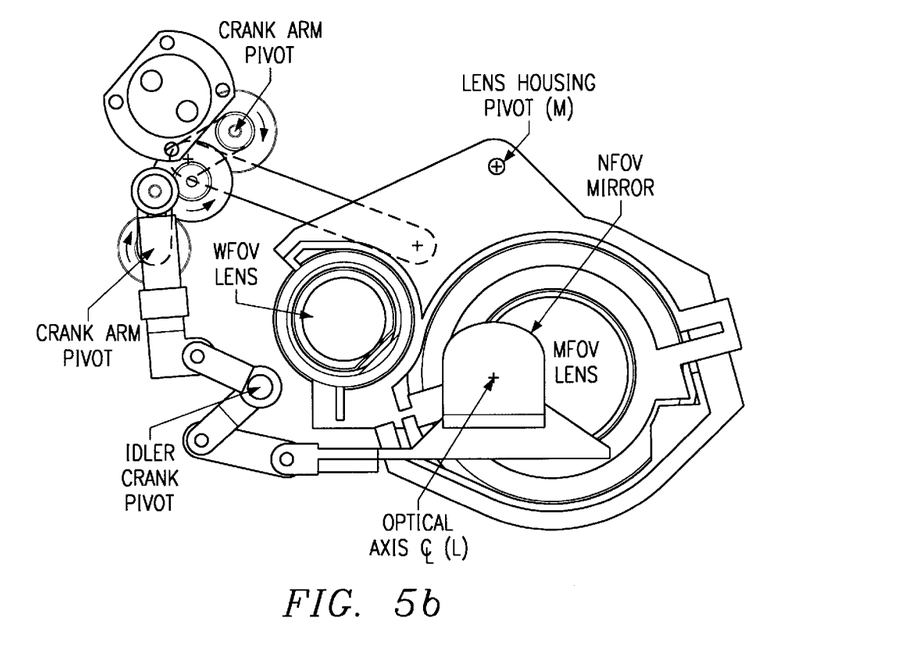
FIG. 5b is a side view similar to FIG. 5a, but showing the arrangement in an operational position for a narrow field of view.
Figure 5C:
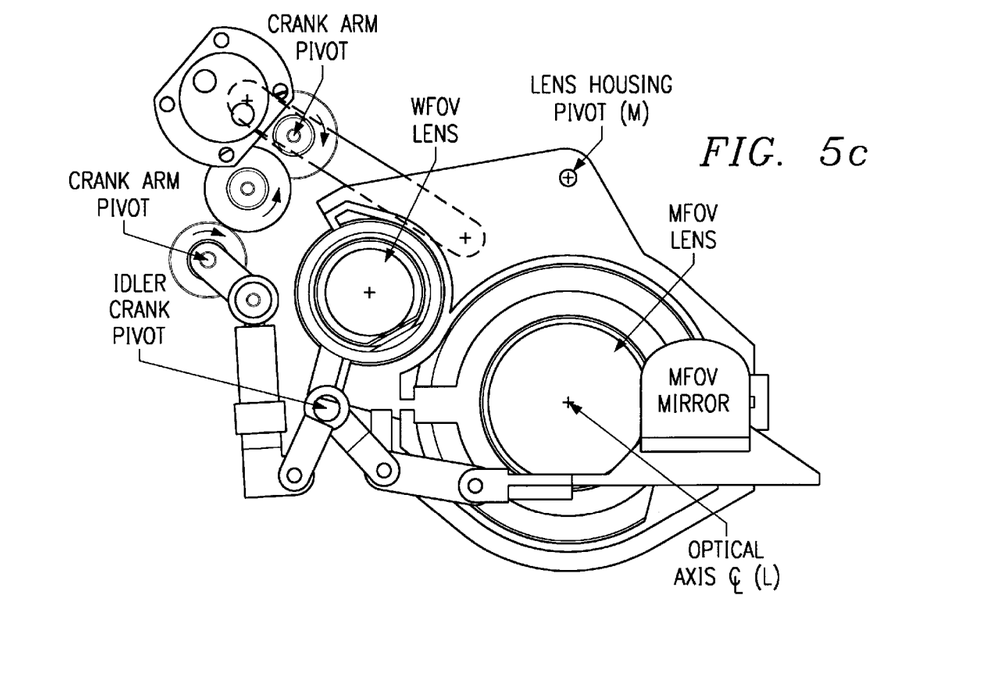
FIG. 5c is a side view similar to FIG. 5a, but showing the arrangement in an operational position for a medium field of view.
Figure 5D:
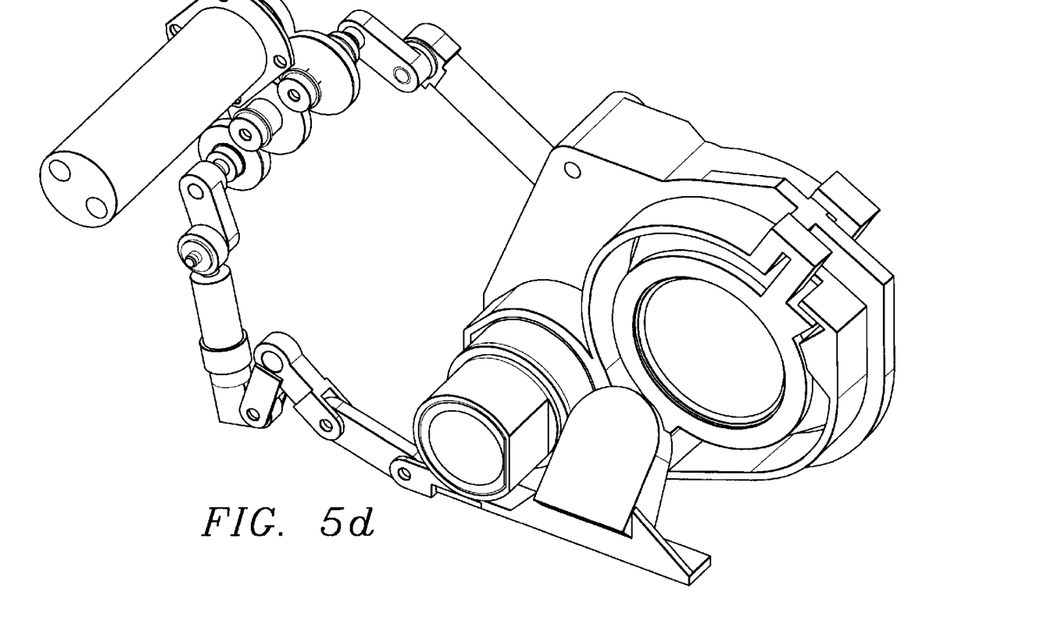
FIG. 5d is a perspective view of the structural arrangement of FIG. 5a, showing the operational position for the wide field of view.
Figure 5E:
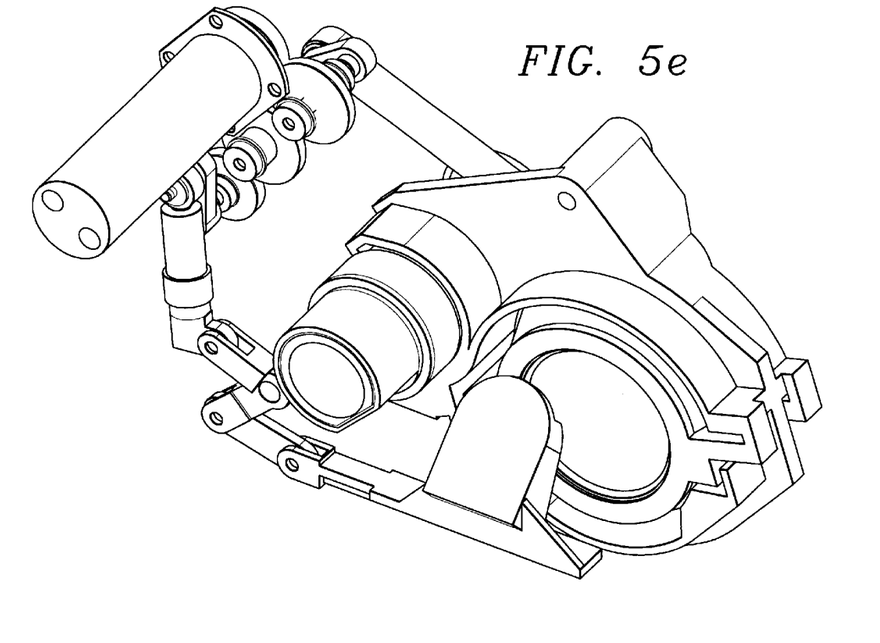
FIG. 5e is a perspective view similar to FIG. 5d, but showing the arrangement in the operational position for the narrow field of view.
Figure 5F:
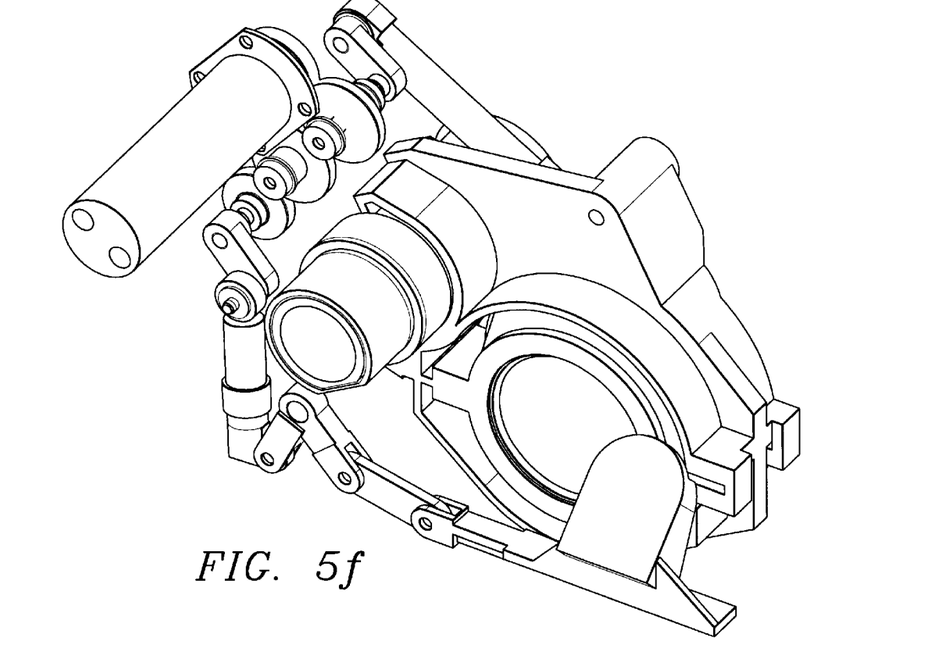
FIG. 5f is a perspective view similar to FIG. 5d, but showing the arrangement in the operational position for the medium field of view.

Referring to FIGS. 5a, 5b and 5c, there is shown a structural arrangement for switching among the three fields of view (FOVs). The MFOV and WFOV lenses (M) and (N) are mounted in a common lens housing (C) and rotate about a pivot point (M) which is located above the lens as shown in these figures. The NFOV fold mirror (K) is mounted on a linear slide table (J) which translates to the left to the optical axis (L) and back to the position shown in FIG. 5c. The NFOV fold mirror (K) and slide table (J) are located behind or aft of the MFOV lens (M).

FIG. 5a shows the lens in the WFOV position, the NFOV fold mirror (K) being located to the right of the optical axis (L). The lens switching sequence is: wide to narrow to medium or medium to narrow to wide. A single motor (O) is used to switch the lens FOVs. The motor (O) drives two crank arms (A) and (D) through a gear train (E). One crank arm (A) drives a linkage (B) that is attached to the lens housing (C) to switch from the MFOV lens (M) to the WFOV lens (N) and back. The other crank arm (D) drives linkages (F) that attach to the narrow FOV fold mirror (K) to switch the mirror.

As the motor (O) turns from the WFOV position shown in FIG. 5a to the NFOV position shown in FIG. 5b, the lens housing (C) rotates about its pivot (M) in a clockwise direction. The lens drive crank arm (A) rotates clockwise 121 degrees and pulls on the lens drive linkage arm (B) which, in turn, pulls the lens housing (C) toward the MFOV position. At the same time, the mirror crank arm (D) is also rotated clockwise 224 degrees through gear train (E). This crank arm (D) pulls on the mirror drive linkage #1 (F) which causes the mirror drive idler crank arm (G) to rotate in a clockwise direction. The idler crank arm (G) pulls on the mirror drive linkage #2 (H) which pulls the mirror linear slide table (J) to the left and toward the optical axis centerline (L). The motor (O) continues to turn until the NFOV fold mirror (K) is on the optical axis (J) and in the NFOV position. When this occurs, the WFOV lens (N) is to the left of the optical axis (L) and the MFOV lens (M) is to the right of the optical axis as shown in FIG. 5b.

To switch from the NFOV position to the MFOV position, the motor (O) continues to turn in the same direction as previously. The lens crank arm (A) continues to rotate clockwise 71 degrees to pull the lens housing (C) clockwise until the MFOV lenses (M) are on the optical axis (L). At the same time, the mirror crank arm (D) continues to rotate clockwise another 132 degrees so that it begins to push on the mirror linkage #1 (F) and rotate the mirror drive idler crank arm (G) in a counterclockwise direction. The idler crank arm (G) pushes on the mirror drive linkage #2 (H) which pushes the linear slide table (J) back to the right of the optical axis (L) to the MFOV position shown in FIG. 5c. The drive motor (O) can be reversed to switch from the MFOV to the NFOV to the WFOV. Mechanical stops (not shown) are used to stop the lens housing in the MFOV and WFOV positions and the mirror (K) in the NFOV position.

In the preferred embodiment shown in the drawings, the narrow FOV aperture 5 is 8.67 inches in diameter and the spherical housing 1 is 16.67 inches in diameter. This makes the FLIR 5 aperture 52 percent of the diameter of the spherical package 1. The window 11 for the narrow FOV optics provides color correction and has an exterior radius of 9.1 inches. The radius of the spherical housing is 8.335 inches. The difference in sag of the narrow FOV lens from the spherical envelope is less than 0.15 inch or 1.7 percent of the sphere radius, thereby providing extremely good aerodynamic characteristics. The sag of the small flat window 7 for the medium and wide FOVs is less than 0.25 inches from the spherical envelope or 3 percent of the sphere radius.

The optics are designed to operate with horizontal scanned, tdi, detector arrays having 240 elements on 28 micron centers or 480 elements on 25 micron centers. This allows a change in performance and cost of the sensor with minimal change to the system. Components in the back half of the spherical sensor housing including the detector, cooling and electronics are changed. The most expensive components such as the gimbal system 4 and optical system with lens switching are retained. The medium FOV is 3.9 times that of the narrow FOV. The wide FOV is 6.2 times that of the medium FOV and 24.15 times that of the narrow FOV.

While the description has been provided with reference to scanning FLIRs, the invention is not limited thereto and can also be applied to staring FLIRs by using a larger FOV imager, a fold mirror for the scanner and a staring focal plane detector for the scanning detector. The FLIR of the preferred embodiment herein uses 8 to 10 micron optics and three afocal lens assemblies. Other wavelength sensors or electro-optical systems could employ this optical configuration and the afocal lenses could be replaced with simple objective lens or reimaging lens systems.

The optical configuration could be employed in any electro-optical system requiring a large aperture ratio in a near spherical envelope such as a missile sensor with an external dome window.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:
1. A FLIR system having a refractive FLIR optical configuration which comprises:
   (a) a substantially spherical housing having a center and substantially circular cross-sections; and
   (b) an optical window disposed in and extending to an outer surface of said housing, said window defining an optical aperture;
   (c) the diameter of said optical aperture defined by the window exceeding the radius of a circular cross-section of said housing passing through said center of said housing.
2. The system of claim 1 further including an optical system disposed within said housing, said optical window being a lens forming a part of said optical system.
3. The system of claim 2 wherein said lens is a near dome-shaped negative lens of relatively high dispersive material, said system further including a positive Ge lens disposed adjacent said negative lens and made of a relatively low dispersive material.
4. The system of claim 3 wherein said housing is substantially in the shape of a truncated sphere.
5. The system of claim 2 wherein said housing is substantially in the shape of a truncated sphere.
6. The system of claim 1 wherein said optical window is a near dome-shaped negative lens of relatively high dispersive material, said system further including a position Ge lens disposed adjacent said negative lens and made of a relatively low dispersive material.
7. The system of claim 6 wherein said housing is substantially in the shape of a truncated sphere.
8. The system of claim 1 wherein said housing is substantially in the shape of a truncated sphere.
9. A FLIR system having a refractive FLIR optical configuration which comprises:
   a substantially spherical housing having a center and substantially circular cross-sections; and
   a first optical system disposed within said housing and extending to a first window at said housing for receiving light through said first window;
   said first optical system being disposed in a volume within said housing bounded by said housing and a plane passing through said center of said housing;
   wherein said first optical system includes an afocal lens system which includes: a first pair of lenses, one lens of said first pair of lenses disposed at a wall of said housing; a first mirror disposed within said volume within said housing bounded by said housing and said plane passing through said center of said housing and reflecting light passing through said first pair of lenses and impinging thereon; a second mirror for receiving said light reflected from said first mirror and reflecting said light along a path parallel to said light impinging upon said first mirror; and a further plurality of lenses for transmission of said light reflected from said second mirror.
10. The system of claim 9 wherein said one lens of said first pair of lenses is a near dome-shaped negative lens of relatively high dispersive material and the other lens of said first pair of lenses is a positive Ge lens disposed adjacent said negative lens and made of a relatively low dispersive material.
11. The system of claim 10 wherein said light reflected from said first mirror is reflected in a direction normal to the direction of said light impinging upon said first mirror.
12. The system of claim 9 wherein said light reflected from said first mirror is reflected in a direction normal to the direction of said light impinging upon said first mirror.

13. The system of claim 9 further including a second window disposed at the surface of said housing and a second optical system disposed in said volume within said housing bounded by said housing and a plane passing through said center of said housing receiving light through said second window, said system further including means to selectively substitute said second optical system for said first pair of lenses, said first mirror and said second mirror.

14. A FLIR system having a refractive FLIR optical configuration which comprises:
   a substantially spherical housing having a center and substantially circular cross-sections; and
   a first optical system disposed within said housing and extending to a first window at said housing for receiving light through said first window;
   said first optical system being disposed in a volume within said housing bounded by said housing and a plane passing through said center of said housing;
   wherein said housing is substantially in the shape of a truncated sphere; and
   wherein said first optical system includes an afocal lens system which includes: a first pair of lenses, one lens of said first pair of lenses disposed at a wall of said housing; a first mirror disposed within said volume within said housing bounded by said housing and said plane passing through said center of said housing and reflecting light passing through said first pair of lenses and impinging thereon; a second mirror for receiving said light reflected from said first mirror and reflecting said light along a path parallel to said light impinging upon said first mirror; and a further plurality of lenses for transmission of said light reflected from said second mirror.

15. The system of claim 14 wherein said one lens of said first pair of lenses is a near dome-shaped negative lens of relatively high dispersive material and the other lens of said first pair of lenses is a positive Ge lens disposed adjacent said negative lens and made of a relatively low dispersive material.

16. The system of claim 15 wherein said light reflected from said first mirror is reflected in a direction normal to the direction of said light impinging upon said first mirror.

17. The system of claim 14 wherein said light reflected from said first mirror is reflected in a direction normal to the direction of said light impinging upon said first mirror.

18. A FLIR system having a refractive FLIR optical configuration which comprises:
   a substantially spherical housing having a center and substantially circular cross-sections; and
   a first optical system disposed within said housing and extending to a first window at said housing for receiving light through said first window;
   said first optical system being disposed in a volume within said housing bounded by said housing and a plane passing through said center of said housing; and
   said first optical system including a second window disposed at the surface of said housing and a second optical system disposed in said volume within said housing bounded by said housing and a plane passing through said center of said housing receiving light through said second window, said system further including means to selectively substitute said second optical system for a portion of said first optical system.

19. An apparatus, comprising:
   a substantially spherical housing having a substantially spherical exterior surface with a radius, and having a window portion which is substantially transparent to infrared radiation and which defines an optical aperture through which infrared radiation can enter said housing, said optical aperture having a diameter which is greater than said radius of said surface of said housing; and
   an optical system disposed within said housing and responsive to infrared radiation which enters said housing through said optical aperture.

20. An apparatus according to claim 19, wherein said housing includes a further window portion which is substantially transparent to infrared radiation, and which defines a further optical aperture through which infrared radiation can enter said housing, said optical system being responsive to infrared radiation which enters said housing through said further optical aperture, and each said optical aperture providing a respective field of view for said optical system.

21. An apparatus according to claim 20, wherein said optical system is a FLIR optical system.

22. An apparatus, comprising:
   a substantially spherical housing having a substantially spherical exterior surface with a centerpoint, said housing including a window portion which has thereon a portion of said exterior surface and which is substantially transparent to infrared radiation;
   a system which is operative to support said housing for pivotal movement about said centerpoint of said exterior surface; and
   an optical system disposed within said housing and responsive to infrared radiation which enters said housing through said optical aperture, said optical system moving with said housing when said housing moves about said centerpoint of said exterior surface.

23. An apparatus according to claim 22, wherein said window portion is a lens having an optical power, said lens being a part of said optical system.

24. An apparatus according to claim 22, wherein said optical system is a FLIR optical system.

25. An apparatus according to claim 22, wherein said system supporting said housing includes a gimbal, and wherein said housing is substantially in the shape of a truncated sphere.

26. An apparatus, comprising:
   a substantially spherical housing having a substantially spherical exterior surface with a centerpoint, and having a window portion which is substantially transparent to infrared radiation and which defines at least one optical aperture through which infrared radiation can enter said housing; and
   an optical system disposed within said housing and responsive to infrared radiation which enters said housing through said window portion, said optical system being a FLIR optical system, and said FLIR optical system occupying a volume within said housing which is less than one-half of the volume of said housing.

27. An apparatus according to claim 26, wherein said volume occupied by said FLIR optical system within said housing is bounded by said housing and a plane passing through said centerpoint of said substantially spherical exterior surface.

28. An apparatus according to claim 26, wherein said FLIR optical system has at least two different fields of view through said window portion.

29. An apparatus according to claim 26, wherein said FLIR optical system has three different fields of view through said window portion.

30. An apparatus, comprising:
   a substantially spherical housing having a substantially spherical exterior surface with a centerpoint, and having a window portion which is substantially transparent to infrared radiation and which defines at least one optical aperture through which infrared radiation can enter said housing; and
   an optical system disposed within said housing and responsive to infrared radiation which enters said housing through said window portion, said optical system having at least two different fields of view through said window portion, and said optical system occupying a volume within said housing which is less than one-half of the volume of said housing.

31. An apparatus according to claim 30, wherein said volume occupied by said optical system within said housing is bounded by said housing and a plane passing through said centerpoint of said substantially spherical exterior surface.

32. An apparatus according to claim 30, wherein said optical system is a FLIR optical system.

33. An apparatus according to claim 30, wherein said optical system has three different fields of view through said window portion.

34. An apparatus according to claim 30, wherein said optical system includes:
   a lens which is near a first section of said window portion, wherein infrared radiation which passes through said first section of said window portion and through said lens represents a first field of view;
   a first mirror which reflects infrared radiation traveling away from said lens;
   a second mirror which is supported for movement between first and second positions, said second mirror reflecting infrared radiation traveling away from said first mirror when said second mirror is in said first position;
   a lens system which, when said second mirror is in said first position, is disposed between said second mirror and a second section of said window portion, wherein infrared radiation which passes through said second section of said window portion and through said lens system represents a second field of view; and
   further optical components which are responsive to infrared radiation traveling away from said second mirror when said second mirror is in said first position, and which are responsive to infrared radiation traveling away from said lens system when said second mirror is in said second position.

35. An apparatus according to claim 34, wherein said first section of said window portion is a lens having an optical power.

36. An apparatus according to claim 34, wherein said optical system is a FLIR optical system.

* * * * *

UNITED STATES PATENT AND TRADEMARK OFFICE
CERTIFICATE OF CORRECTION

PATENT NO. : 5,936,771
DATED : August 10, 1999
INVENTOR(S) : Erwin E. Cooper

It is certified that error appears in the above-identified patent and that said Letters Patent is hereby corrected as shown below:

<u>Title page,</u>
Item [60], Related U.S. Application Data, insert -- Provisional application No. 60/024,380, filed on Aug. 14, 1996. --

<u>Column 1,</u>
Line 4, insert -- This application claims benefit of provisional application No. 60/024,380 filed on Aug. 14, 1996. --.

Signed and Sealed this

First Day of April, 2003

JAMES E. ROGAN
*Director of the United States Patent and Trademark Office*